United States Patent [19]
Kabatnik et al.

[11] Patent Number: 5,881,823
[45] Date of Patent: Mar. 16, 1999

[54] HAND MACHINE TOOL WITH BATTERY OPERATED DRIVE MOTOR, AND BATTERY UNIT FOR THE SAME

[75] Inventors: Wilfried Kabatnik, Leinfelden-Echterdingen; Rainer Glauning, Stuttgart, both of Germany

[73] Assignee: Robert Bosch GmbH, Stuttgart, Germany

[21] Appl. No.: 641,199

[22] Filed: Apr. 30, 1996

[30] Foreign Application Priority Data

Jun. 14, 1995 [GB] United Kingdom .............. 195 21 423

[51] Int. Cl.$^6$ .............................. B25F 3/00; B23B 45/61
[52] U.S. Cl. ................................ 173/217; 310/47; 310/50
[58] Field of Search .................... 173/217, 117, 173/216, 104; 310/47, 50

[56] References Cited

U.S. PATENT DOCUMENTS

| | | | |
|---|---|---|---|
| 4,050,528 | 9/1977 | Foltz et al. ............................... | 173/217 |
| 4,930,583 | 6/1990 | Fushiya et al. .......................... | 173/217 |
| 5,083,620 | 1/1992 | Fushiya et al. .......................... | 173/217 |
| 5,553,675 | 9/1996 | Pitzen et al. ............................. | 173/217 |
| 5,671,815 | 9/1997 | Kabatnik et al. ........................ | 173/217 |

FOREIGN PATENT DOCUMENTS 3502449  2/1992  Germany .

*Primary Examiner*—Scott A. Smith
*Attorney, Agent, or Firm*—Michael J. Striker

[57] ABSTRACT

A hand machine tool has a battery operated drive motor accommodated in a machine housing, with a battery housing mountable on said machine housing. The mounting of the battery housing of the machine housing is performed by two guiding strips arranged on the machine housing and engaging in guiding grooves provided in the battery housing. In a locking position, the battery housing is held by a spring-loaded slider which has two legs provided with end arresting projections form-lockingly engaged with stationary arresting projection provided on the battery housing, for locking the battery housing on the machine housing.

3 Claims, 5 Drawing Sheets

HAND MACHINE TOOL WITH BATTERY OPERATED DRIVE MOTOR, AND BATTERY UNIT FOR THE SAME

BACKGROUND OF THE INVENTION

The present invention relates to a hand machine tool with a battery operated drive motor, as well as to a battery unit for such a hand machine tool.

Hand machine tools with battery operated drive motors are known in the art. One of such hand machine tools is disclosed for example in the German document DE-35 02 449 C2. The hand machine tool disclosed in this document has a releasably mountable battery unit and is composed of parts and assemblies of a network current operated hand machine tool adapted to a battery-operated device. The mounting of the battery unit on the hand machine tool is performed by a console which is arranged under a machine housing and inserted in a guiding slot of the battery unit. Shortly before reaching a locking position of the battery unit, a guiding of the battery housing is performed by a guiding housing arranged at the end side on the handle of the hand machine tool. The guiding housing in view of its exposed arrangement can be relatively easily damaged. The battery unit then will not be sufficiently guided and therefore contact difficulties can occur.

SUMMARY OF THE INVENTION

Accordingly, it is an object of the present invention to provide a hand machine tool which avoids the disadvantages of the prior art.

It is also an object of the present invention to provide a battery unit for such a hand machine tool which avoids the disadvantages of the prior art.

In keeping with these objects and with others which will become apparent hereinafter, the hand machine of the present invention has a drive motor arranged in a machine housing and a battery unit mountable on the machine housing with corresponding guiding and locking means wherein in accordance with the new features of the present invention the guiding means is formed as at least one guiding strip mounted on the machine housing and engageable in a guiding groove arranged on a battery housing of the battery unit, while the locking means include a spring biased arresting projection displaceable on the machine housing in direction toward its arresting position and form-lockingly engageable with at least one stationary arresting projection provided on the battery unit.

In accordance with another feature of the present invention a battery unit is provided for such a hand machine tool, which battery unit is formed so that for mounting the battery unit of the hand machine tool with the battery housing, the battery unit has at least one guiding groove and for locking the battery unit on the hand machine tool at least one stationary arresting projection is formed on the battery housing.

In accordance with still another feature of the present invention a hand machine tool is provided in which the guiding means is formed as a guiding strip arranged on the machine housing and engageable in a guiding groove of the battery housing of the battery unit and the locking means is formed as a spring-biased arresting projection displaceable to the arresting position and provided with the machine housing as well as form-lockingly engageable with the stationary arresting projection of the battery unit.

When the hand machine tool and the battery unit are designed in accordance with the present invention, a dimensionally accurate and disturbance free guidance is provided. The guide is integrated in the battery unit and in the machine housing so that no additional parts are needed. The battery unit is easily mountable on the machine housing or removed from the machine housing and can be locked in an event of dirt or dust caused by the operation.

In accordance with an especially advantageous feature of the present invention, despite the battery unit mounted on the machine housing, it has a two-cell construction which facilitates the mountability of the hand machine tool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
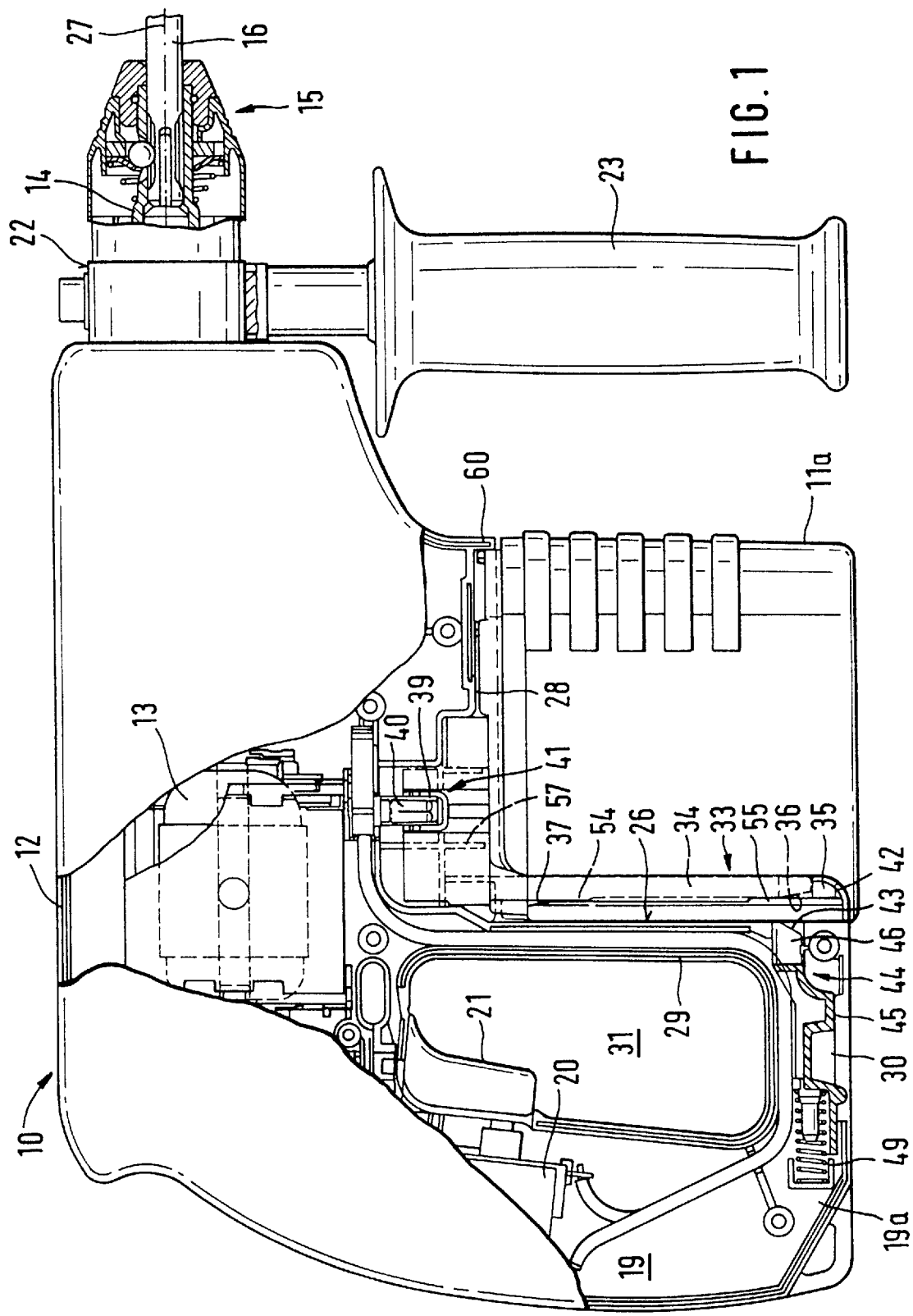
FIG. 1 is a view showing a longitudinal section of a hand machine tool with a mounted battery unit in accordance with the present invention.

A hammer drill identified with reference numeral 10 in FIG. 1 serves as an example of a hand machine tool. A battery housing 11a of a battery unit 11 is mounted on the hand machine tool. The hammer drill 10 has machine housing 12 accommodating a battery operated drive motor 13. The drive motor 13, through a not shown transmission, drives in rotation a drive spindle 14 which partially extends from the machine housing 12. Moreover, a tool 13 inserted in a tool receptacle 15 of the hammer drill 10 can also be driven from the drive motor 13 through a not shown impact mechanism to deliver impacts.

Figure 2:
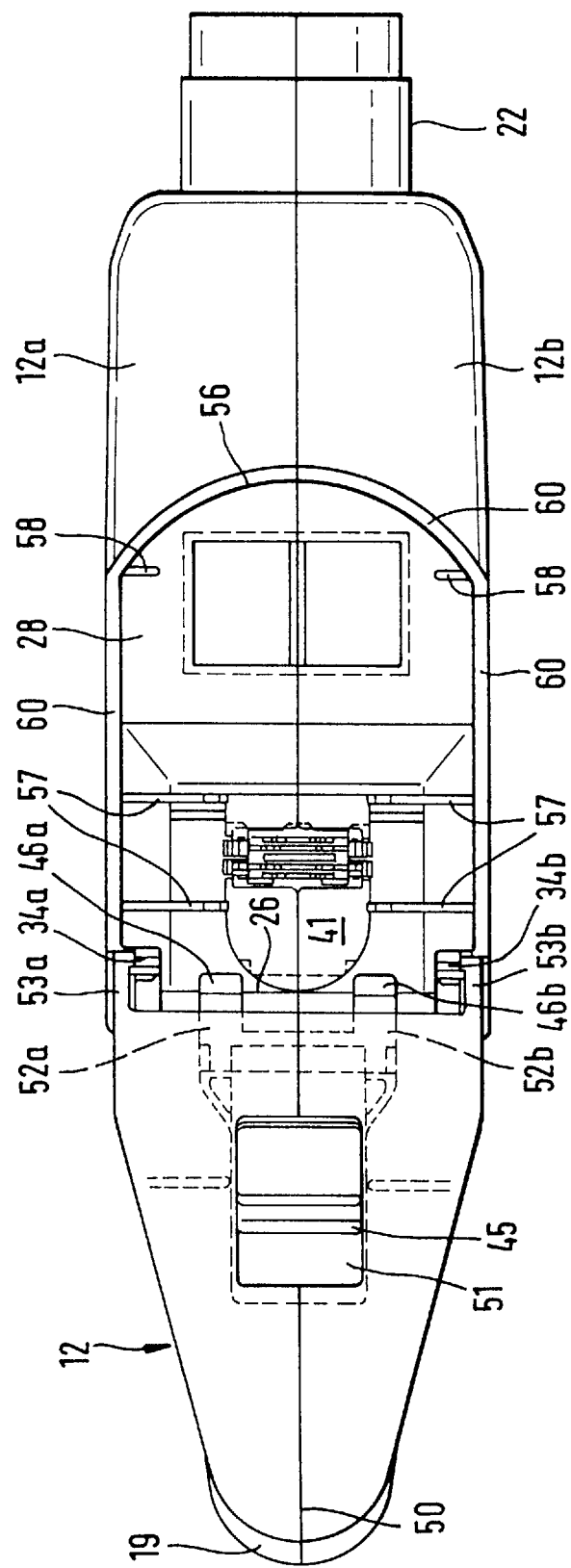
FIG. 2 is a view showing the hand machine tool of the present invention from above without the battery unit.

The machine housing 12 is formed as a two-shell element with a separation plane 50 indicated in the plane of the drawing of FIG. 1, as can be seen from FIG. 2. At the end of the hammer drill 10 which faces away from the tool receptacle 15, a handle 19 is formed of one piece on the machine housing 12. The handle 19 is formed substantially as a pistol handle and is provided with switch 20 with a pressing member 21. The machine housing 12 forms a clamping neck 22 near the tool receptacle 15, and a handle 23 is mounted on the clamping neck.

Figure 5:
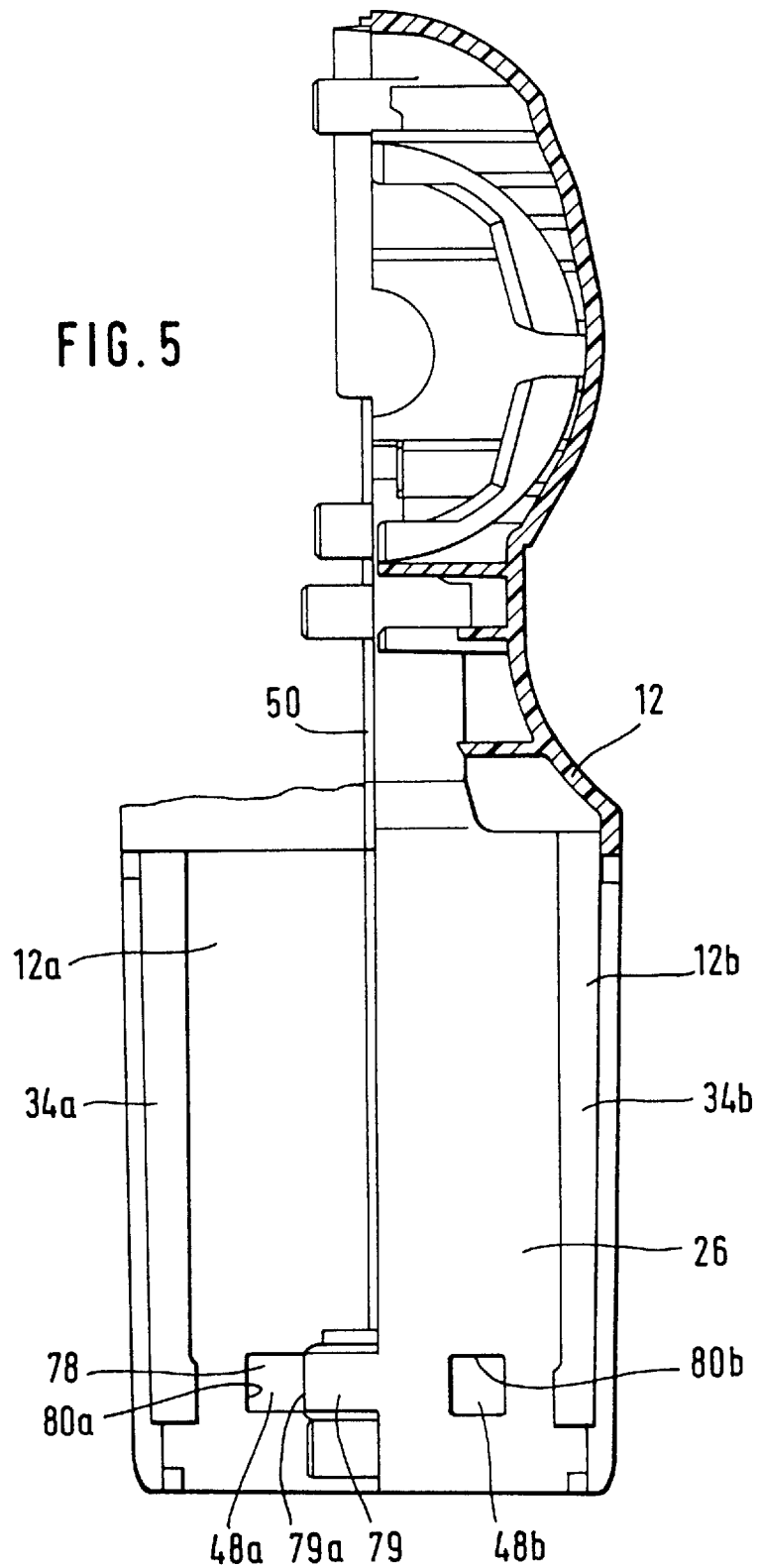
FIG. 5 is a partial front view of the hand machine tool.

The machine housing 12 is formed for receiving the battery housing 11a in the region between the rear handle 19 and the front auxiliary handle 23. For this purpose the battery housing 11a is provided with a guiding surface 26 which extends transversely to the longitudinal axis 27 of the hammer drill 10 as shown in FIG. 5, and is also provided with an abutment surface 28 which is located perpendicular to it under the hammer drill 10 as shown in FIG. 2. The guiding surface 26 is formed on a housing portion 29 located forwardly of the handle 19. At its lower end facing away from the drive motor 13, it is connected with a lower end 19a of the handle 19 through a connecting web 30. A through-going opening 31 for actuation of the pressing member 21 and for holding the hammer 10 by an operator, is provided between the handle 19, the housing portion 29 and the connecting web 30.

Figure 3:
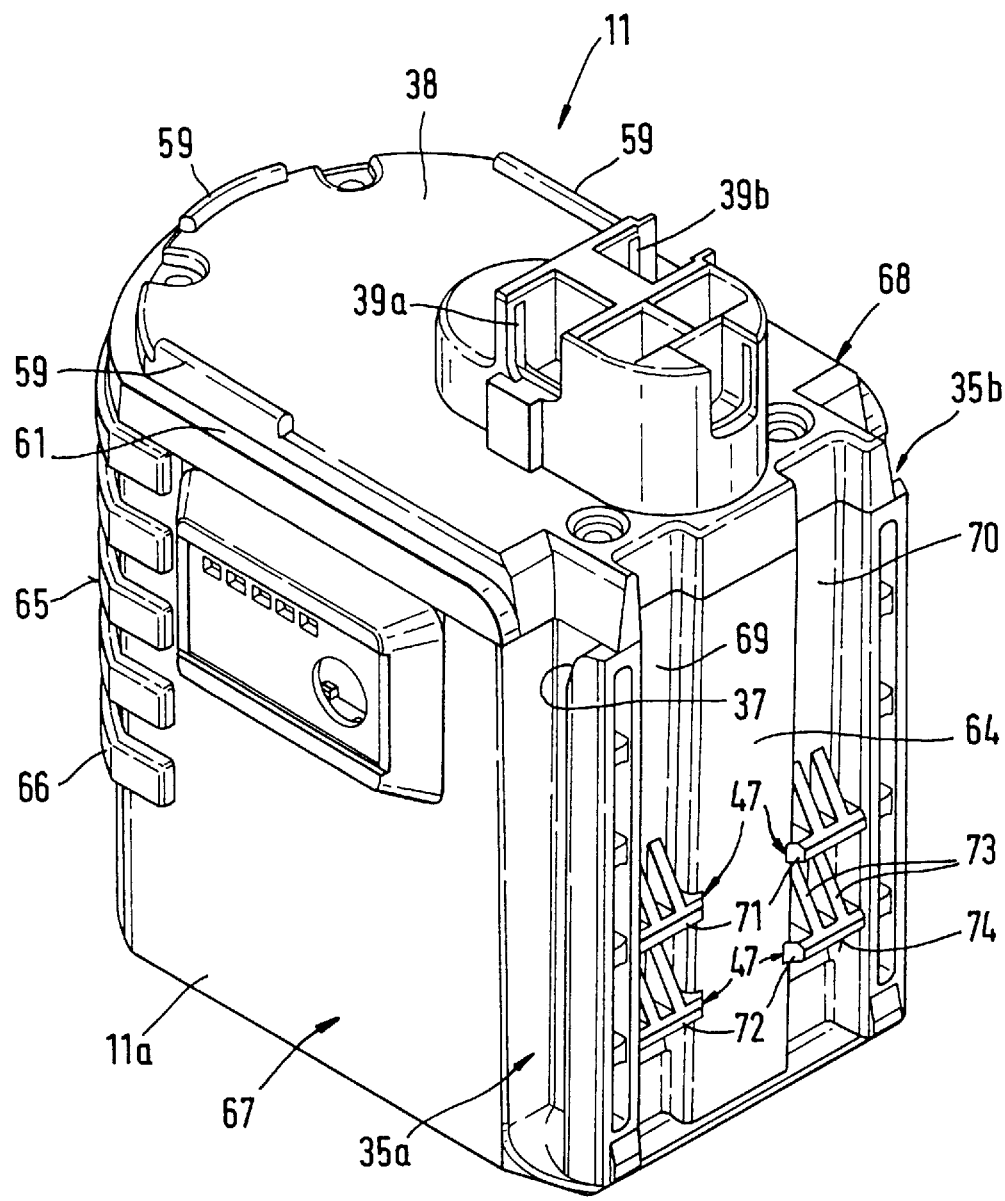
FIG. 3 is a perspective view of the battery unit in accordance with the present invention.

Guiding means 33 are provided for holding the battery housing 11. The guiding means include two guiding strips 34 which are arranged at a distance from one another on the machine housing 12 and spaced from the guiding surface 26 as can be seen from FIG. 5. Also, corresponding guiding grooves 34 are formed in the battery housing 11a as shown in FIG. 3 for engagement of the guiding strips 34. The guiding groove 35 with the battery housing 11a are open upwardly as can be seen from FIG. 3. Therefore, the battery housing 11a can be mounted from below by insertion of the guiding strips 34 into the guiding groove 35 on the machine housing 12, until an upper side 38 of the battery housing 11a abuts against the abutment surface 28. In this locking position of the battery housing 11a, the contact surfaces 29 which are in electrically conductive contact with the rechargeable batteries arranged in the battery housing 11a, are in electrically conductive contact with contact springs 40 extending outwardly of a contact receptacle 41 of the machine housing 12.

In order to facilitate the mounting of the battery housing 11a on the machine housing 12, the guiding strips 34a, b are offset back by approximately 10 mm from an edge 42 formed between the guiding surface 26 and the connection web 30. The guiding grooves 35 are expanded toward their machine-side end. Therefore the battery housing 11a can be first brought to abutment with a rear side 64 against the guiding surface 26 before insertion of the guiding strip 34 into the guiding groove 35. For facilitating the insertion, the guiding strip 34 and the guiding groove 35 are provided with insertion inclines 36, 37. Moreover, the guiding play or gap between the guiding strips 34 and the guiding groove 35 reduces first relative to the end of the insertion path. In particularly the guiding strip 34 and the guiding groove 35 are expanded or narrowed at their inner ends facing away from the insertion inclines 36, 37 with a small gap. The expansion 64 of the guiding strip 34 and the narrowing 55 of the guiding groove 35 are shown in FIG. 1. Thereby an approximately gap-free seating of the battery housing 11a on the machine housing 12 in the locking position is guaranteed, so that the mounting of the battery housing 11a on the machine housing 12 is not made difficult in particular when the guiding means 33 are dirtied.

Locking means 44 are provided for locking the battery housing 11a on the machine housing 12. The locking means include a slider 45 which is displaceable in the connecting web 30 perpendicular to the insertion direction of the battery housing 11a. It extends with arresting projections 46 outwardly of the guiding surface 26 of the machine housing 12 and cooperate with arresting projections 47 formed on the battery housing 11a. The slider 45 is loaded in direction toward the arresting position by a spring 49, which on the other hand is supported on the machine housing 12. The spring 49 presses the arresting projections 46 arranged at the end side on the slider 45, through corresponding windows 48a, b out of the machine housing 12. Therefore, the arresting projections 46 form-lockingly engage the arresting projections 47 in the locking position of the battery housing 11a. in FIG. 1 the slider 45 is shown in a retracted position, or in other words, the battery housing 11a is unlocked.

FIG. 2 shows the lower side of the machine housing 12 without the battery housing 11a. It can be seen that the machine housing 12 is separated along the separation plane 50 into two shells 12a, b. Moreover, the clamping neck 22 is formed on the machine housing 12, and the handle 19 is provided on the opposite end of the machine housing 12. the connecting web 30 extends from the handle 19 and expands substantially V-shaped toward a housing portion 29. It has an actuating window 51 for the slider 45. The slider 45 is indicated partially in broken lines, so that its fork-shaped form can be clearly seen. Both arresting projections 46a, b are formed on two legs 52a, b of the slider 45 at their free end. The arresting projections 46a, b extend outwardly through the guiding surface 26 of the machine housing 12 and are provided with an incline 43 in their insertion direction for sliding on the arresting projection 47. Thereby the slider 30, during mounting of the battery housing 11a, is pressed back on the arresting projection 47 against the force of the spring 49, until the arresting projections 46a, b engage behind the arresting projection 47.

The arresting strips 34a, b are formed on the webs 53a, b and located inwardly opposite to one another. Because of the distance between the guiding strips 34a, b from the guiding surface 26, the guiding strip 34 can be inserted laterally into the outwardly open guiding grooves 35a, b arranged in the battery housing 11a.

The abutment surface 28 extending perpendicular to the guiding surface 26 has partially a rectangular shape, and its front end face 56 is curved outwardly. Reinforcing ribs 57 extend back from the contact receptacle 41 radially toward one side. The reinforcing ribs 57 in the mounted machine housing 12 form a funnel-shaped insertion opening for the battery housing 11a in the contact receptacle 41. Therefore, the contacts 39, 40 are guided exactly in one another. The abutment surface 28 carries a downwardly projecting edge 60 at the lateral and front sides. Webs 58 in the machine housing 12 together with edge strips 59 on the battery housing 11a act as an abutment for the battery housing 11a on the abutment surface 26 of the battery housing 11a. For this purpose the webs 58 abut against the surface 38 of the battery housing 11a. The edge strips 59 abut laterally against the edge 60 in the event of lateral deviation of the battery housing 11a. The edge 60 together with an edge surface 61 forms a shadow joint with a width approximately 1 mm. Due to alternating-side insertion of the edge 60 in the side 38 of the battery housing 11a and the web 58 relative to the edge strip 59, the battery housing 11a is additionally supported. Therefore, the guiding means 13 are unloaded especially during occurrence of lateral impact loads.

As can be seen from FIG. 3, the battery housing 11a is mounted on two out of six outer surfaces of the machine housing 12. These outer surfaces are formed on an upper side 38, front side 35, a rear side 64, as well as side faces 67, 68 and a bottom face. The front side 65 is curved outwardly and provided with gripping ribs 66 extending at a distance from one another. The curvature of the front side 65 of the battery housing 11a has a curvature radius of more than 20 mm, preferably substantially 40 mm. In this way, the front side 65 of the battery housing 11a can operate, when the battery housing 11 is mounted on the machine housing 12, as a further gripping surface instead of the auxiliary handle 23.

Guiding grooves 35a, b are open outwardly and formed in the side faces 67, 68 of the battery housing 11a near the rear side 64. Two parallel locking grooves 69, 70 are provided in the rear side 64 so that the horizontally oriented arresting projection 46a, b can engage in them during mounting of the battery housing 11a on the machine housing 12. The locking grooves 69, 70 are interrupted by two transverse ribs 71, 72 which are offset in the insertion direction and form the arresting projecting 47. The transverse ribs have rum-shaped insertion inclines provided at the insertion side and corresponding to the inclines 43. At their other side they have perpendicularly extending arresting surfaces 74. Due to the arrangement of two arresting projections 47 per each locking groove 69, 70, the safety against loosening of the battery housing 11a is increased. If the battery housing 11a is loosened from its operational position in which the transverse ribs 72 are engaged by the arresting projections 46, the battery housing 11a can be displaced maximum to the second transverse rib 71 and then contacts 39, 40 are separated.

Figure 4:
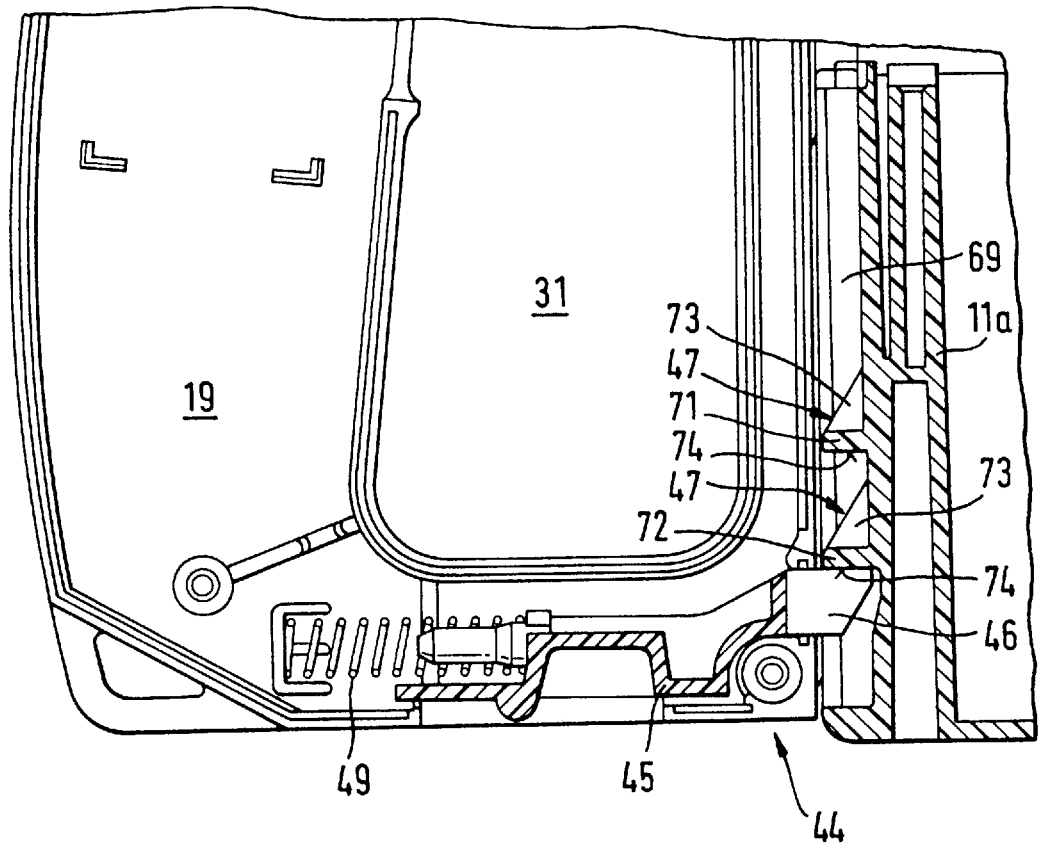
FIG. 4 is a partial view through the hand machine tool with the mounted battery unit in accordance with the present invention.

The locking means 44 are shown in FIG. 4 in their locking position. This Figure clearly shows the arresting projections 46 formed on the battery housing 11a at the rear side in the locking grooves 69, 70, and provided with transverse ribs 71, 72. The transverse ribs have the insertion incline 73 at the insertion side and form arresting surfaces 74 provided at the locking side and engageable by the arresting projections 46 of the slider 45 for locking.

FIG. 5 shows a view of the machine housing 12 forwardly on the guiding surface 26 without the battery housing 11a. It can be seen that the outwardly arranged guiding strips 34a, b are located opposite to one another. The machine housing 12 is subdivided along the separating plane 50 in two housing shells 12a, b. In order to mount the slider 45 with its both legs 52 through the window 45, the separation plane 50 is formed specially in the region of the window 48. In particular, the first window 48b formed in the first housing shell 12b has a circularly closed frame 80b, while the second window 48a provided with a second housing shell 12a has a frame 80a which is open at one end side and formed by an open slot 78. The slot is received in the second housing shell 12a and is open toward the separation plane 50. A bracket 79 is arranged on the first housing shell 12b and extends over the separation plane 50. With the assembled housing shells 12b, it engages in the slot 78, and with its free end 79 of the frame 80a completes a circularly closed frame. In this manner, the slider 45 with its both legs 52 are mounted before the assembly of the machine housing 12 in the first housing shell 12b.

It will be understood that each of the elements described above, or two or more together, may also find a useful application in other types of constructions differing from the types described above.

While the invention has been illustrated and described as embodied in a hand machine tool with battery operated drive motor, and battery unit for the same, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hand machine tool, comprising a drive motor operating independently from an electric network; a machine housing accommodating said drive motor; a battery unit for electrical current supply of said drive motor; a battery housing accommodated said battery unit; a guiding means for guiding said battery unit during its mounting on said machine housing; locking means for locking said battery unit on said machine housing, said guiding means including at least one guiding strip arranged on said machine housing and a guiding groove provided in said battery housing so that said at least one guiding strip is engageable in said guiding groove, said locking means including at least one spring loaded movable arresting projection extending from said machine housing toward an arresting position and at least one stationary arresting projection formed so that said at least one movable arresting projection form-lockingly engages said at least one stationary arresting projection in a locking position of said battery unit on said machine housing; and a handle, said machine housing having a housing portion located forwardly of said handle as considered in an insertion direction and extending perpendicular to a longitudinal axis so as to be connected by a connecting web with an end of said handle, said at least one guiding strip being formed on said housing portion of said machine housing.

2. A hand machine tool as defined in claim 1, wherein said guiding means includes a further guiding strip arranged so that said at least one and further guiding strips are located at a distance from one another; and further comprising a web which connects said at least one and further guiding strips with said housing portion.

3. A hand machine tool as defined in claim 2; and further comprising a slider which is mounted in said connecting web displaceably against a spring force and having two legs, said at lease one movable arresting projection being provided on said legs of said slider; and a spring which loads said slider in a direction toward said battery unit.

\* \* \* \* \*